May 6, 1947.     E. F. SALSBURY     2,420,100
VEHICLE SPEED GOVERNED BELT TRANSMISSION
Filed Nov. 8, 1943     4 Sheets-Sheet 1

INVENTOR
ESLEY F. SALSBURY
BY
HARRIS, KIECH, FOSTER & HARRIS
FOR THE FIRM
ATTORNEYS

May 6, 1947. E. F. SALSBURY 2,420,100
VEHICLE SPEED GOVERNED BELT TRANSMISSION
Filed Nov. 8, 1943 4 Sheets-Sheet 2

INVENTOR
ESLEY F. SALSBURY
BY
HARRIS, KIECH, FOSTER & HARRIS
FOR THE FIRM
ATTORNEYS

May 6, 1947.  E. F. SALSBURY  2,420,100

VEHICLE SPEED GOVERNED BELT TRANSMISSION

Filed Nov. 8, 1943  4 Sheets-Sheet 4

INVENTOR
ESLEY F. SALSBURY
BY
HARRIS, KIECH, FOSTER & HARRIS
FOR THE FIRM

ATTORNEYS

Patented May 6, 1947

2,420,100

UNITED STATES PATENT OFFICE 2,420,100

VEHICLE SPEED GOVERNED BELT TRANSMISSION

Esley F. Salsbury, Los Angeles, Calif., assignor to Salsbury Corporation, Los Angeles, Calif., a corporation of California Application November 8, 1943, Serial No. 509,416

2 Claims. (Cl. 180—70)

My invention relates to vehicles, and the principal object of the invention is to provide a drive between the driving wheels and the engine of such a vehicle.

My invention is particularly applicable to three and four wheeled vehicles using relatively small engines, that is to say, engines of about five horsepower.

The principal object of the invention is to provide an automatic driving means for such a vehicle which can be wholly controlled by the throttle of the engine without the necessity for a gear shift lever or clutch lever, the clutch being entirely automatic and the transmission automatically changing the transmission ratio to suit the speed of the vehicle.

A further object of the invention is to provide in such a vehicle a separate drive for each of two driving wheels so that these driving wheels will be driven at the proper speed, not only when the vehicle is proceeding in a straight line, but also when it is called upon to turn a corner.

Further objects and advantages will be made evident hereinafter.

Referring to the drawings, which are for illustrative purposes only,

Figure 1:
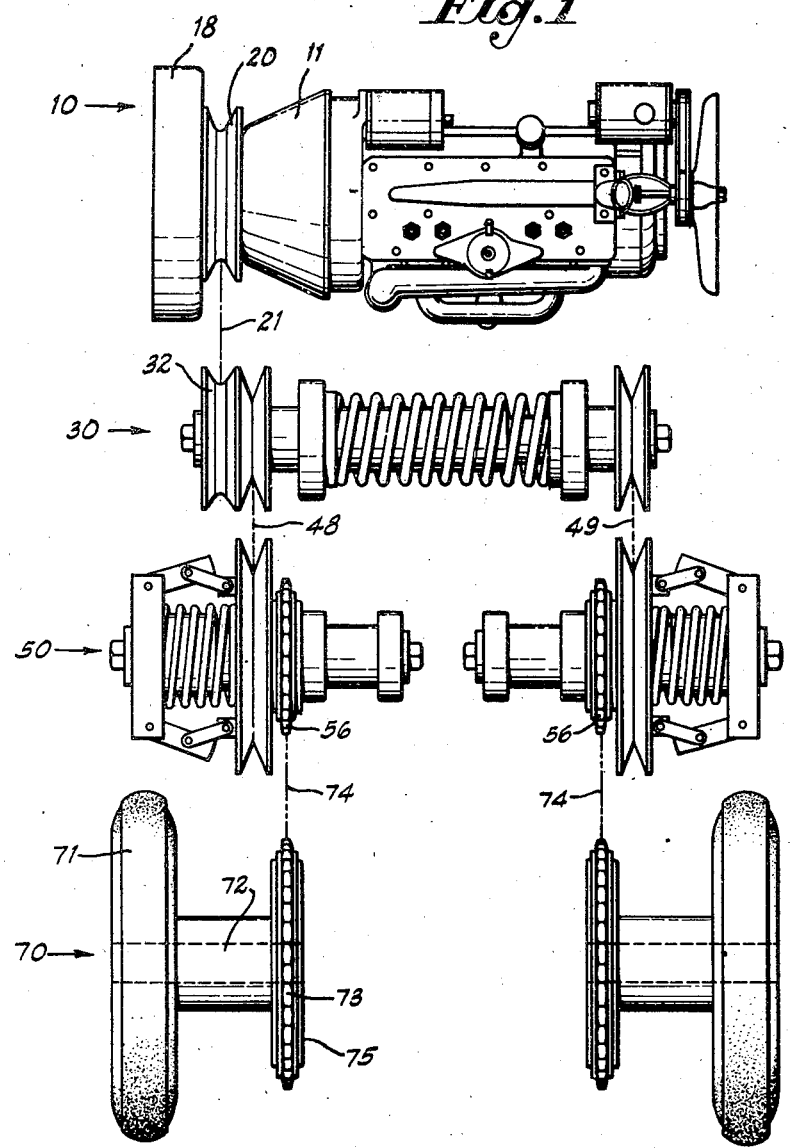
Fig. 1 is a plan assembly view of the drive.

The mechanism, for purpose of description, may be divided into four elements, namely, a motor assembly 10, a countershaft assembly 30, a jack shaft assembly 50, and a wheel assembly 70. These assemblies are shown in Fig. 1 as if they were placed in a plane, but in actual assembly of the vehicle they need not be so placed.

Figure 2:
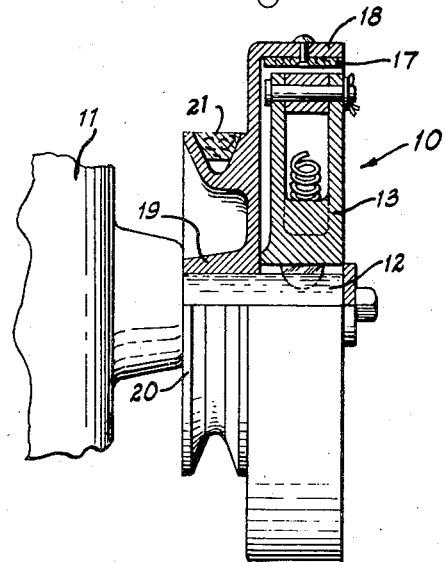
Fig. 2 is a section through the motor shaft and clutch on a plane represented by the line 2—2 of Fig. 3.
Figure 3:
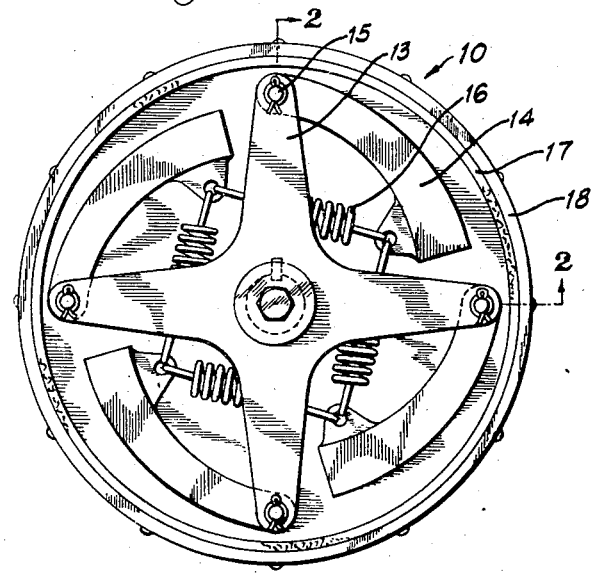
Fig. 3 is an end view of the clutch.

Referring to Figs. 2 and 3, which show the motor assembly, the motor 11 is an internal combustion engine provided with the usual throttle control, so that its speed can be varied by controlling the throttle position. This engine 11 has a shaft 12 upon which is keyed a clutch spider 13. The clutch spider 13 carries four shoes 14, these shoes being pivoted to turn on pins 15 carried on the spider 13 and being held in the retracted position shown by springs 16 secured thereto. When the motor is at rest, these shoes assume the position shown in Fig. 3, and when the motor shaft rotates above idling speed, which may be as high as one-third full load speed, the centrifugal force of the shoes is sufficient to throw them out against a clutch lining 17 which is secured in a brake drum 18 having a hub 19 which is free to turn on the shaft 12 and thus cause this drum to rotate with the engine shaft. An engine pulley 20 is provided on the drum 18, this pulley being adapted to receive a V-belt 21. This belt may be of the familiar V-form used in drives of this character. When the engine shaft is at rest or rotating below a certain critical speed, hereinafter called "idling speed," the shoes 14 are retracted, and the shaft 12 turns inside the drum 18. The belt 21 is therefore not driven when the engine is standing at rest or when the engine is rotating below idling speed.

Figure 4:
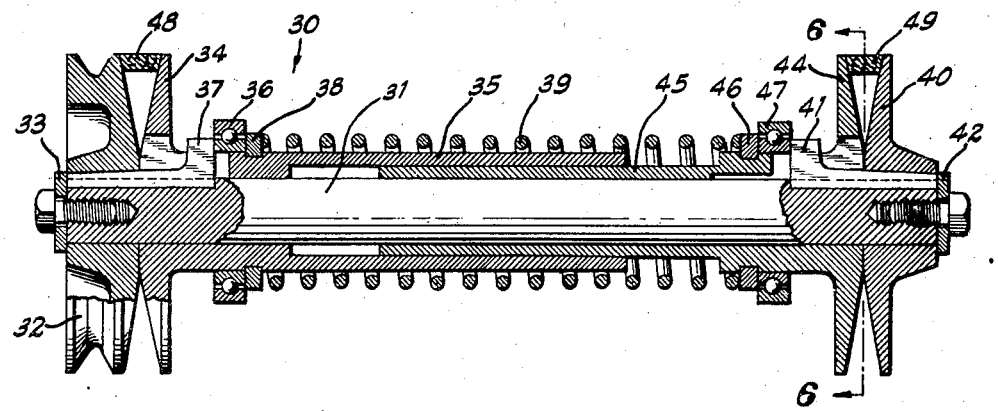
Fig. 4 is a section through the countershaft with its associated parts, with the pulleys in the position they assume at full speed of the vehicle.
Figure 5:
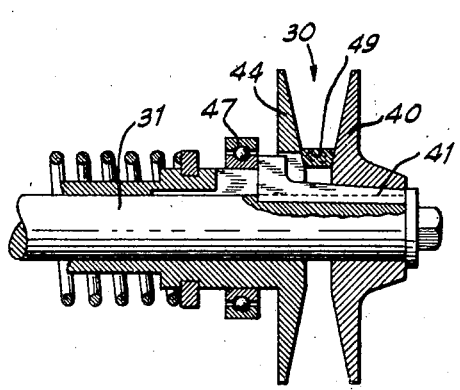
Fig. 5 is a partial section similar to Fig. 4, but with the parts in the positions they assume at low speed of the vehicle.
Figure 6:
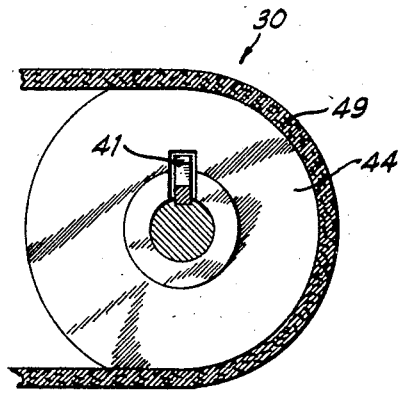
Fig. 6 is a section on a plane represented by the line 6—6 of Fig. 4.

The countershaft assembly shown in Figs. 4, 5, and 6 consists of a shaft 31, on one end of which is mounted a driven engine pulley 32. This pulley 32 is keyed to the shaft and is prevented from moving axially off the end of the shaft by a washer 33 held in place by a bolt. As viewed in Fig. 4, the face of the pulley 32 is of conical form for the purpose of gripping the engine belt 21, this belt also passing over the engine pulley 20 shown in Fig. 2. Mounted to slide freely on the shaft 31 is a movable pulley member 34, this member having a long hub 35 which slides inside a ball bearing 36. The bearing 36 is supported on the frame of the vehicle by means not shown. An L-shaped key 37 forces the pulley member 34 to rotate with the shaft and also keys the pulley 32 to the shaft. The hub 35 of the movable pulley member 34 is provided with a spring washer 38. This washer is a ring made of rather elastic metal which is split at one side so that it can be sprung and snapped over the hub 35, seating in a groove and forming a bearing for the end of a compression spring 39. The compression spring 39 tends to force the movable pulley member 34 to the left, as shown in Fig. 4, for the purpose of gripping the belt 21. Secured on the other end of the shaft 31 is a pulley member 40 which is also kept from rotating by an L-shaped key 41 and from moving axially to the right by a washer 42 held by a bolt. The key 41 passes through a movable pulley member 44 and prevents it from turning on the shaft. The pulley member 44 has a hub 45 which projects inside the hub 35 previously described. The hub 45 also has a spring washer 46 which forms an abutment for the compression spring 39. The two L-shaped keys 37 and 41, which bear against the sides of the ball bearings 36 and 47, keep the shaft 31 in central alignment with these bearings, which are rigidly secured to the structure of the vehicle.

A V-belt 48 is gripped between the driven engine pulley 32 and the movable pulley member 34, and a V-belt 49 is gripped between the movable pulley member 44 and the pulley member 40. The spring 39 tends to hold the movable pulley members in firm contact with the belts, but it yields and allows the belts to pull the pulley faces apart when sufficient tension is exerted on the belts. In Fig. 5 I show the positions of the pulley members and the belt 49 when it is pulled down into its lower position. This is the position the belt assumes when the vehicle is operating in what is colloquially known as "low gear," that is, a gear in which the speed of the rear wheels is low as compared with the engine speed, and Fig. 4 shows the belts 48 and 49 in the positions they assume in "high gear," that is to say, when the wheels are running at a relatively high speed with relation to the engine speed.

Figure 7:
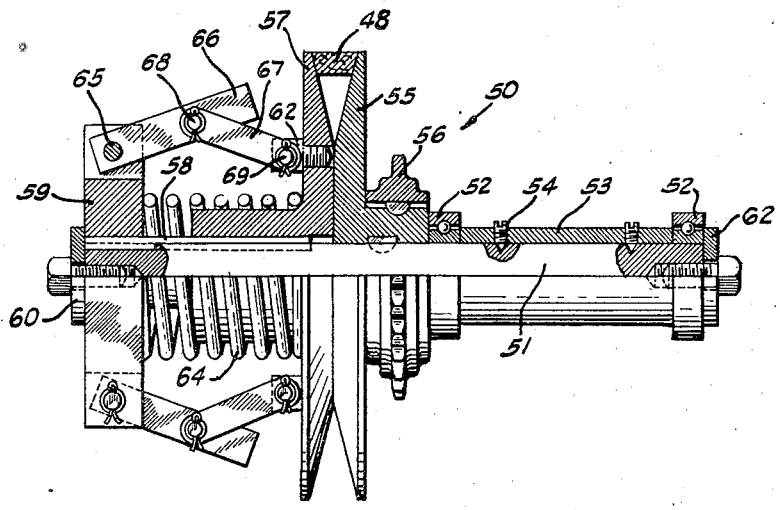
Fig. 7 is a section through a jack shaft.
Figure 8:
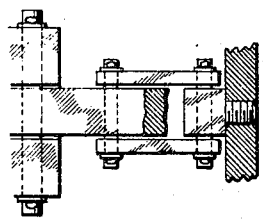
Fig. 8 is a partial plan view of the mechanism shown in Fig. 7.
Figure 9:
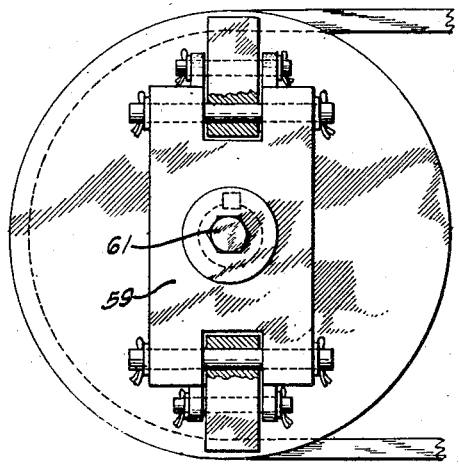
Fig. 9 is an end view of a jack shaft.

Two jack shaft assemblies are provided, as shown in Figs. 7, 8, and 9. These assemblies are exact duplications of each other, but, of course, one of them is turned over into a different position, as shown in Fig. 1. Each of these jack shaft assemblies consists of a shaft 51 which turns in bearings 52, being held in axial alignment with these bearings by a collar 53 which is held in place by set-screws 54. Mounted on each of the shafts 51 is a fixed pulley face 55 which has a sprocket 56 also secured thereon. A movable pulley face 57 is free to slide on the shaft 51, but is provided with a key 58 to insure its turning with the shaft. A governor bracket 59 is keyed to and rigidly secured to the end of the shaft 51, the shaft being held in central alignment by a washer 60 secured by a bolt on one end of the shaft and by a washer 62, this washer 62 bearing against the bearings 52 and held in place by a bolt on the other end of the shaft, the washer 60 providing an abutment for the governor bracket. Between the governor bracket and the movable pulley 57, I provide a compression spring 64, this spring tending to force the pulley faces 55 and 57 together to engage the belt 49, as shown in Fig. 7. Mounted on pins 65 in the governor bracket 59 are two governor weights 66, these weights being mounted diametrically opposite each other so that a reasonable degree of balance can be maintained. A link 67 is pivoted on a pin 68 in each of the governor weights, and pivoted on a pin 69 secured to a pivot 62 threaded in the pulley 57. The arrangement of parts 65 to 69 is, in effect, a ball governor which is held in the position shown in Fig. 7 by the compression spring 64. When, however, the shaft 51 is rotated above a critical speed, the governor weights 66 tend to rotate about the pin 65 and to pull the pulley face 57 away from the pulley face 55. The position of the pulley face 55 with relation to the pulley face 57 is determined wholly by the amount of centrifugal force exerted on the governor weights 66, which in turn is dependent upon the speed at which the shaft 51 is rotated. As will be hereinafter explained, this shaft is rotated at all times at a speed directly proportional to the speed of the rear wheels of the vehicle so that the position of the pulley face 57 with relation to the pulley face 55 is determined by the speed of the vehicle. When the wheels are running below a critical gear shift speed, the belt 49 and the companion belt 48 are in the positions shown in Fig. 7, that is to say, the low gear position. As the speed of the wheels, and, of course, the speed of the vehicle, increases, the pulley faces are pulled apart and the pulley drops to the bottom of the groove. In other words, as the speed increases, the effective diameter of the pulley formed by the pulley faces 55 and 57 is decreased.

No separate assembly is made of the wheel assembly 70, which, as shown adequately in Fig. 1, consists essentially of a rubber-tired wheel 71 carried on a shaft 72 to which it is rigidly keyed, the shaft 72 carrying on its opposite end a driven sprocket 73. This sprocket is driven by a chain 74 from one of the sprockets 56. The shaft 72 is mounted in suitable ball bearings 75.

The method of operation of the invention is as follows. The parts being assembled on a vehicle with suitable supports (not shown), and the engine stationary, that is, the shaft thereof not rotating, the clutch shoes 14 are not in engagement with the clutch lining 17 due to the action of the springs 16. If the engine is therefore started and the throttle is kept in a position such that it delivers only enough fuel to the engine to cause it to rotate below idling speed, the engine may be started and will continue to rotate at idling speed without the clutch shoes becoming engaged so that the clutch drum is not rotated. When, however, the operator wishes to start the vehicle, he increases the engine speed above idling speed, which may be as much as one-third the full load speed of the engine, and the centrifugal force exerted on the shoes 14 causes them to move outwardly and engage the clutch lining 17 so that the clutch drum 18 is driven. The engine belt 21 is, of course, also driven, and this belt, engaging the pulley 32 of the countershaft assembly, drives the shaft 31 of the countershaft assembly. The springs 64 on the jack shaft assemblies 50 are much more powerful than the spring 39, so that until the governor starts to act the pulleys of the jack shaft assemblies 50 are in the positions shown in Fig. 7, and the pulleys of the countershaft assembly 30 are in the positions shown in Fig. 5. In other words, the effective diameter of the driving pulleys on the countershaft assembly is a minimum, and the diameter of the driven pulleys on the jack shaft assemblies is a maximum. It will be understood that by "driving pulleys" we mean the pulleys made up of the members 32 and 34 and 40 and 44, and by "driven pulleys" we mean the pulleys made up of the members 55 and 57 of the jack shaft. Since the driving pulleys on the countershaft are at their smallest diameter, and the driven pulleys on the jack shaft assemblies are at their maximum diameter, the vehicle operates in what is colloquially termed "low gear," the wheels being driven through the driving sprocket 56 on the jack shaft, and the driven sprockets 73 on the wheel shaft.

The governors on the jack shafts, as previously explained, however, rotate at all times in synchronism with, that is, at a speed proportionate to, the wheel speed, and, as the vehicle picks up speed, that is to say, as the speed of the vehicle increases, the governor weights 66 gradually move out to pull the pulley faces 55 and 57 apart, thus decreasing the effective diameter of the driven pulleys on the jack shafts. This tends to momentarily decrease the tension on the belt, and the spring 39 forces the driving pulleys on the countershaft gradually from the position shown in Fig. 5 into the position shown in Fig. 4. This enables the wheels to be driven faster without increasing the speed of the engine, and this procedure continues until the driving pulleys are of maximum diameter and the driven pulleys are of minimum diameter, at which time the vehicle may be said to be in "high gear." Any increase in the engine speed, when the vehicle is in high gear, will result in a higher speed of the vehicle. It will thus be seen that the vehicle shifts from low gear to high gear automatically in accordance with the necessity for such shifting. In other words, as the rear wheels increase in speed and the vehicle speed increases, the transmission gradually shifts into high gear without any attention or thought on the part of the operator. It is highly desirable, if not absolutely necessary, that light vehicles of the class to which this transmission is applied have such an automatic transmission, as they are ordinarily built as tricycles, the front wheel being controlled by handle-bars, which require both hands of the operator to guide them. The operation of such vehicles is somewhat more difficult than an ordinary automobile, and any simplification in the transmission is greatly appreciated by the user.

The transmission works in reverse whenever the speed of the vehicle is reduced. If, for example, the vehicle comes to a hill and the engine is not able to pull it up the hill at high speed with the transmission in "high," the speed of the vehicle decreases, the governors are pulled in by the governor weights 66 approaching the center of the shaft 51 due to the action of the spring 64, and the vehicle gradually changes into "low." If the hill is sufficiently steep, it may go entirely down to low gear in this process. As soon as the hill has been climbed and the vehicle can pick up speed, it immediately goes into high gear again. The centrifugal clutch shown in Figs. 2 and 3 is also entirely automatic, the clutch being firmly engaged as long as the engine is rotating above idling speed regardless of whether or not the engine is in fact driving the vehicle or the vehicle is driving the engine. An important point of novelty is the fact that each of the jack shafts 50 functions independently so that if the vehicle is turning a corner and one of the wheels 71 is running at a higher speed than the other, the transmission automatically shifts to drive one wheel faster than the other. The dual transmission takes the place of the differential gear ordinarily provided in automotive vehicles, and at the same time permits each of the wheels 71 to be given an independent spring suspension.

I claim as my invention:

1. In a vehicle having a motor and two driven wheels, the combination of: two V-belt transmissions, each having a driving pulley and a driven pulley, each driving pulley being driven at a speed proportional to the motor speed, each driven pulley driving one of said wheels; two V-belts, each driving one of said driven pulleys and being itself driven by one of said driving pulleys; two centrifugally operated governing means, each of which actuates means to reduce the effective diameter of a driven pulley within limits as the speed of the wheel the driven pulley drives increases, and acting to increase the diameter of said driven pulley within limits as the speed of said wheel decreases, each of said governing means being carried on and rotating at the speed of its driven pulley; and means for increasing or diminishing the diameters of said driving pulleys to maintain proper tension on said belts as the diameters of said driven pulleys change.

2. In a vehicle having a motor and two driven wheels, the combination of: a shaft; means by which said motor drives said shaft; two driving pulleys, each driven by said shaft at a speed proportional to the motor speed; two driven pulleys, each driving one of said wheels; two V-belts, each driving one of said driven pulleys and being itself driven by one of said driving pulleys; two centrifugally operated governing means, each of which actuates means to reduce the effective diameter of a driven pulley within limits as the speed of the wheel the driven pulley drives increases, and acting to increase the diameter of said driven pulley within limits as the speed of said wheel decreases, each of said governing means being carried on and rotating at the speed of its driven pulley; and means for increasing or diminishing the diameters of said driving pulleys to maintain proper tension on said belts as the diameters of said driven pulleys change.

ESLEY F. SALSBURY.

REFERENCES CITED

The following references are of record in the file of this patent:

UNITED STATES PATENTS

| Number | Name | Date |
| --- | --- | --- |
| 1,852,552 | Altorfer | Apr. 5, 1932 |
| 1,948,084 | Welch | Feb. 20, 1934 |
| 2,173,661 | Perrine | Sept. 19, 1939 |

FOREIGN PATENTS

| Number | Country | Date |
| --- | --- | --- |
| 11,449 | British | 1905 |